US011426718B2

(12) United States Patent
Ohtake et al.

(10) Patent No.: US 11,426,718 B2
(45) Date of Patent: Aug. 30, 2022

(54) CERIUM OXIDE PARTICLES AND METHOD FOR PRODUCTION THEREOF

(71) Applicant: RHODIA OPERATIONS, Paris (FR)

(72) Inventors: Naotaka Ohtake, Tokushima (JP); Fabien Ocampo, Audun-le-Tiche (FR); Rui Miguel Jorge Coelho Marques, Shangai (CN)

(73) Assignee: RHODIA OPERATIONS, Paris (FR)

( * ) Notice: Subject to any disclaimer, the term of this patent is extended or adjusted under 35 U.S.C. 154(b) by 632 days.

(21) Appl. No.: 16/302,481

(22) PCT Filed: May 17, 2017

(86) PCT No.: PCT/EP2017/061897
§ 371 (c)(1),
(2) Date: Nov. 16, 2018

(87) PCT Pub. No.: WO2017/198738
PCT Pub. Date: Nov. 23, 2017

(65) Prior Publication Data
US 2019/0202710 A1 Jul. 4, 2019

Related U.S. Application Data

(60) Provisional application No. 62/338,372, filed on May 18, 2016.

(51) Int. Cl.
*B01J 37/03* (2006.01)
*B01J 37/10* (2006.01)
*B01J 23/10* (2006.01)
*B01J 35/10* (2006.01)
*B01J 37/08* (2006.01)
*C01F 17/235* (2020.01)
*B01D 53/94* (2006.01)

(52) U.S. Cl.
CPC .......... *B01J 37/031* (2013.01); *B01J 23/10* (2013.01); *B01J 35/1014* (2013.01); *B01J 35/1047* (2013.01); *B01J 37/08* (2013.01); *B01J 37/10* (2013.01); *C01F 17/235* (2020.01); *B01D 53/94* (2013.01); *B01D 2255/2065* (2013.01); *B01D 2255/91* (2013.01); *B01D 2255/9207* (2013.01); *C01P 2002/50* (2013.01); *C01P 2006/12* (2013.01); *C01P 2006/14* (2013.01); *C01P 2006/16* (2013.01)

(58) Field of Classification Search
CPC ...... B01J 37/031; B01J 23/10; B01J 35/1014; B01J 35/1047; B01J 37/08; B01J 37/10; C01F 7/235
See application file for complete search history.

(56) References Cited

U.S. PATENT DOCUMENTS

| 4,356,106 A | 10/1982 | Woodhead et al. |
| 7,361,322 B2 | 4/2008 | Aozasa et al. |
| 2006/0150526 A1 | 7/2006 | Ota et al. |
| 2007/0264486 A1* | 11/2007 | Verdier ............... B01J 23/10 |
| | | 428/315.5 |
| 2009/0220398 A1 | 9/2009 | Verdier et al. |
| 2010/0329954 A1* | 12/2010 | Yokota ............... C01F 17/241 |
| | | 423/213.2 |
| 2014/0205522 A1 | 7/2014 | Ifrah et al. |

FOREIGN PATENT DOCUMENTS

| EP | 1435338 A1 | 7/2004 |
| EP | 3020689 A1 | 5/2016 |
| FR | 2570087 A1 | 3/1986 |
| WO | 98/45212 A1 | 10/1998 |

OTHER PUBLICATIONS

Terribile, "The Synthesis and Characterization of Mesoporous High-Surface Area Ceria Prepared Using a Hybrid Organic/Inorganic Route", 1998, Journal of Catalysis, 178, 299-308</span> (Year: 1998).*
International Preliminary Report on Patentability issued in International Application No. PCT/EP2017/061897, dated Nov. 20, 2018 (10 pages).

* cited by examiner

*Primary Examiner* — James A Fiorito
(74) *Attorney, Agent, or Firm* — Osha Bergman Watanabe & Burton LLP

(57) ABSTRACT

The present invention relates to cerium oxide particles that have excellent heat resistance and/or pore volume especially useful for catalysts, functional ceramics, solid electrolyte for fuel cells, polishing, ultraviolet absorbers and the like, and particularly suitable for use as a catalyst or cocatalyst material, for instance in catalysis for purifying vehicle exhaust gas. The present invention also relates to a method for preparing such cerium oxide particles, and a catalyst, such as for purifying exhaust gas, utilizing these cerium oxide particles.

21 Claims, No Drawings

CERIUM OXIDE PARTICLES AND METHOD FOR PRODUCTION THEREOF

CROSS-REFERENCE TO RELATED APPLICATIONS

The present application is a U.S. national stage entry under 35 U.S.C. § 371 of International Application No. PCT/EP2017/061897 filed May 17, 2017, which claims the priority of U.S. provisional application 62/338,372 filed on May 18, 2016. The entire contents of these applications are explicitly incorporated herein by this reference.

The present invention relates to cerium oxide particles that have excellent heat resistance and/or pore volume especially useful for catalysts, functional ceramics, solid electrolyte for fuel cells, polishing, ultraviolet absorbers and the like, and particularly suitable for use as a catalyst or co-catalyst material, for instance in catalysis for purifying vehicle exhaust gas. The present invention also relates to a method for preparing such cerium oxide particles, and a catalyst, such as for purifying exhaust gas, utilizing these cerium oxide particles.

BACKGROUND

The following discussion of the art is provided to place the invention in an appropriate technical context and enable the advantages of it to be more fully understood. It should be appreciated, however, that any discussion of the art throughout the specification should not be considered as an express or implied admission that such art is widely known or forms part of common general knowledge in the field.

Catalysts for purifying vehicle exhaust gas are composed of a catalytic metal such as platinum, palladium, or rhodium, and a co-catalyst for enhancing the catalytic action of such metal, both supported on a catalyst support made of, for example, alumina or cordierite. As such a co-catalyst material are used cerium oxide-containing materials, which have the properties of absorbing oxygen under the oxidizing atmosphere and desorbing oxygen under the reducing atmosphere, originated in cerium oxide, i.e., oxygen absorbing and desorbing capability. With this oxygen absorbing and desorbing capability, the cerium oxide-containing materials purify noxious components in exhaust gas such as hydrocarbons, carbon monoxide, and nitrogen oxides at excellent efficiency. As such, large quantities of the cerium oxide-containing materials are used as a co-catalyst.

It is most critical for activating the function of such cerium oxide-containing co-catalyst material to keep the co-catalyst at a high temperature. Low temperature of the exhaust gas, for example at engine start-up, will result in low purifying efficiency. Vehicle manufacturers are presently trying to solve this problem by placing the catalyst system close to the engine for introducing hot exhaust gas right after its emission from the engine into the catalyst system. There is also a demand for co-catalyst materials that are activated at lower temperatures.

In general, efficiency of exhaust gas treatment with a catalyst is proportional to the contact area between the active phase of the catalyst and the exhaust gas, and to the oxygen absorbing and desorbing capability of the co-catalyst material, such as cerium oxide. Thus the co-catalyst material is required to have a sufficiently large specific surface area and a sufficiently high oxygen absorbing and desorbing capability, as well as high activity at lower temperatures. In addition, the co-catalyst material is often required to have a sufficient large pore volume, in particular the pore volume of pores having no more than 200 nm pore size, so that gas diffusion can be increased, thus attaining a high gas purification efficiency.

For solving these problems, U.S. Pat. No. 7,361,322 B2 proposes a method for obtaining a cerium oxide having good heat resistance with a specific surface area higher than 30.0 $m^2/g$ after calcination at 900° C. for 5 hours, especially around 40-50 $m^2/g$, comprising the steps of:
(a) providing a cerium solution wherein not less than 90 mol % of the cerium are tetravalent cerium cations, said cerium solution having a cerium concentration of 10 to 60 g/L in terms of cerium oxide;
(b) holding said cerium solution prepared in step (a) at 60 to 220° C. under heating;
(c) cooling said heated cerium solution;
(d) adding a precipitant to said cooled cerium solution to obtain a precipitate; and
(e) calcining said precipitate.

However it appears that heat resistance of specific surface area of these cerium oxides obtained by this process are still not sufficient. Moreover, the process disclosed in U.S. Pat. No. 7,361,322 B2 does not disclose the addition of an organic texturing agent in one of the steps. The mesoporosity of the particles is therefore different from the mesoporosity of the particles of the present invention.

Also, heat resistance of total pore volume has also come to be required in addition to heat resistance of specific surface area of catalyst supports. High heat resistance of total pore volume usually means that decrease ratio of pore volume in comparison of two different ageing conditions of catalyst supports, such as fresh and 900° C., is small. In the case of loading an active species in the form of a precious metal, such as active metal, onto a catalyst support, the precious metal is loaded with good dispersibility into pores. Thus, a cerium oxide having a large pore volume even at high temperatures is desirable.

There is still a need to provide cerium oxides having higher heat resistance and oxygen absorbing and desorbing capability useful as a catalyst or a co-catalyst material suitable for a catalyst, such as for purifying exhaust gas.

BRIEF DESCRIPTION OF THE INVENTION

It is therefore an object of the present invention to provide cerium oxide (cerium (IV) oxide) that has excellent heat resistance and absorbing and desorbing capability and/or pore volume, useful for catalysts, functional ceramics, solid electrolyte for fuel cells, polishing, ultraviolet absorbers and the like, and particularly suitable for use as a catalyst or co-catalyst material, particularly in catalysis for purifying vehicle exhaust gas. Cerium oxides particles of the present invention also provide high heat resistance of total pore volume and specific surface area. Cerium oxides particles of the invention are in particular capable of maintaining a large specific surface area even in use in a high temperature environment under air and certain gas condition (see claim 1). These cerium oxide particles are also capable of exhibiting high oxygen absorbing and desorbing capability in a lower temperature range. Further, cerium oxide particles according to the present invention may exhibit excellent pore volume value and/or pore volume value of pores having no more than 200 nm pore size. Invention also concerns a method for preparing these cerium oxide particles, and a catalyst for purifying exhaust gas utilizing said cerium oxide particles.

Cerium oxide particles of the invention also provide a high $NO_x$ capture performance, permitting then reduction of $NO_x$ emission from automobiles in order to follow stringent pollutants regulations. These cerium oxide particles are then also useful for $NO_x$ trap (LNT) catalysts.

The present invention then concerns cerium oxide particles having the following properties:
- a specific surface area (SBET) comprised between 45 and 80 m²/g, more particularly between 50 and 80 m²/g, even more particularly between 55 and 80 m²/g, after calcination at 900° C. for 5 hours, under air; and
- a specific surface area (SBET) comprised between 75 and 90 m²/g, more particularly between 78 and 90 m²/g after calcination at 700° C. for 4 hours, under a gaseous atmosphere containing 10% by volume of $O_2$, 10% by volume of $H_2O$ and the balance of $N_2$.

More particularly, the particles exhibit the following properties:
- a specific surface area (SBET) comprised between 55 and 80 m²/g after calcination at 900° C. for 5 hours, under air; and
- a specific surface area (SBET) comprised between 75 and 90 m²/g after calcination at 700° C. for 4 hours, under a gaseous atmosphere containing 10% by volume of $O_2$, 10% by volume of $H_2O$ and the balance of $N_2$.

The cerium oxide particles may exhibit at least one of the following properties:
- a specific surface area (SBET) comprised between 30 and 60 m²/g, more particularly between 37 and 60 m²/g, even more particularly between 40 and 60 m²/g after calcination at 900° C. for 24 hours, under air;
- a specific surface area (SBET) comprised between 22 and 40 m²/g, more particularly between 26 and 40 m²/g after calcination at 1000° C. for 5 hours, under air;
- a total pore volume comprised between 1.5 and 4.0 ml/g after calcination at 400° C. for 10 hours, under air;
- a total pore volume comprised between 1.5 and 3.8 ml/g after calcination at 900° C. for 24 hours, under air;
- a pore volume of the pores having a pore size in the range of no more than 200 nm comprised between 0.3 and 1.5 ml/g after calcination at 400° C. for 10 hours, under air;
- a pore volume of the pores having a pore size in the range of no more than 200 nm comprised between 0.25 and 1.0 ml/g after calcination at 900° C. for 24 hours, under air.

They may also exhibit at least one of the following properties:
- a specific surface area (SBET) comprised between 37 and 60 m²/g, after calcination at 900° C. for 24 hours, under air;
- a specific surface area (SBET) comprised between 26 and 40 m²/g after calcination at 1000° C. for 5 hours, under air;
- a total pore volume comprised between 1.5 and 4.0 ml/g after calcination at 400° C. for 10 hours, under air;
- a total pore volume comprised between 1.5 and 3.8 ml/g after calcination at 900° C. for 24 hours, under air;
- a pore volume of the pores having a pore size in the range of no more than 200 nm comprised between 0.3 and 1.5 ml/g after calcination at 400° C. for 10 hours, under air;
- a pore volume of the pores having a pore size in the range of no more than 200 nm comprised between 0.25 and 1.0 ml/g after calcination at 900° C. for 24 hours, under air.

The present invention also concerns a method for preparing cerium oxide particles, in particular the cerium oxide particles of the present invention, comprising at least the steps of:

(a) providing a cerium salt solution comprising anions and cations, wherein between 90 and 100 mol % of the cerium cations are tetravalent cerium cations;
(b) heating said cerium salt solution at a temperature comprised between 60 and 220° C. in order to obtain a suspension comprising a liquid medium and a precipitate;
(c) decreasing the concentration of anions from the cerium salt present in the liquid medium between 10 and 90 mol %, in comparison with said anions comprised in the liquid medium in step (b);
(d) heating the suspension obtained in step (c) at a temperature comprised between 100 and 300° C.;
(e) optionally cooling the suspension obtained in the step (d);
(f) bringing said suspension into contact with a basic compound;
(g) heating the suspension from the step (f) at a temperature comprised between 60 and 300° C.;
(h) optionally separating off the precipitate from the liquid medium;
(i) optionally adding an organic texturing agent to the suspension obtained in step (g) or the precipitate obtained in step (h);
(j) optionally separating off the precipitate from the liquid medium; and
(k) calcining the precipitate obtained at the end of step (g) or obtained at step (h), (i) or (j) to obtain cerium oxide particles; said method comprising at least said step (h) and/or at said step (j),
wherein trivalent cerium (III) cations must be present in one of the steps before the precipitation step (f).

The invention also concerns cerium oxide particles susceptible to be obtained by this process.

Other characteristics, details and advantages of the invention will emerge even more fully upon reading the description which follows.

Definitions

Throughout the description, including the claims, the term "comprising one" should be understood as being synonymous with the term "comprising at least one", unless otherwise specified, and "between" should be understood as being inclusive of the limits.

It is specified that, in the continuation of the description, unless otherwise indicated, the values at the limits are included in the ranges of values which are given.

The contents are given as oxides, unless otherwise indicated. The cerium oxide is in the form of cerium oxide ($CeO_2$).

In the continuation of the description, the term "specific surface area" is understood to mean the BET specific surface area determined by nitrogen adsorption in accordance with standard ASTM D 3663-78 laid down from the Brunauer-Emmett-Teller method described in the periodical "The Journal of the American Chemical Society, 60, 309 (1938)". The specific surface areas may be determined with an appliance Flowsorb II 2300 of Micromeritics according to the guidelines of the constructor. They may also be determined with a Macsorb analyzer model I-1220 of Mountech according to the guidelines of the constructor. Prior to the measurement, the samples are degassed under vacuum and by heating at a temperature of at most 200° C. to remove the adsorbed species. Conditions may be found in the examples.

The porosity curves and the values derived from them (like the mean size or the total pore volume) are determined by intrusion of mercury in accordance with standard ASTM- D-4284-83 ("Standard method for determining pore volume distribution of catalysts by mercury intrusion porosimetry").

The porosity measurement method given above makes it possible to obtain pore size plots giving the pore volume as a function of the pore size (V=f(d), V denoting the pore volume and d denoting the pore diameter). From this pore size plot it is possible to obtain, again in a known manner, a curve (C) giving the derivative dV/d log D. From the cumulative curve and the data obtained, it is possible to read the pore volumes, in particular the total pore volume and the total pore volume for the pores in the range of no more than 200 nm.

Micromeritics Autopore IV 9500 can be used following the conditions present in the guidelines of the appliance. Total pore volume is determined directly on the porosity curves.

As used herein, the term "alkyl" groups is intended to mean: a saturated aliphatic hydrocarbon-based group containing between 1 and 22 carbon atoms, advantageously between 1 and 10 carbon atoms, of formula $C_nH_{2n+1}$, obtained by removing a hydrogen from an alkane. The alkyl group may be linear or branched. By way of example, the alkyl groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. In complex structures, the chains may be branched or bridged.

DETAILS OF THE INVENTION

About the Method for Preparing the Cerium Oxide

The method for preparing the cerium oxide of the invention involves the use of $Ce^{IV}$ and $Ce^{III}$ cations. According to the present method, first a cerium salt aqueous solution, wherein between 90 and 100 mol % of the cerium cations are tetravalent is provided in step (a). Thus, the aqueous solution of $Ce^{IV}$ and optionally $Ce^{III}$ cations is characterized by a molar ratio $Ce^{IV}$/total cerium of at least 0.9. This ratio may be 1.0.

In step (a), the cerium salt solution, may preferably be a cerium nitrate solution, a cerium ammonium nitrate solution, a cerium sulfate solution and/or a cerium ammonium sulfate solution. Cerium salts may be ionic compounds usually resulting from the neutralization reaction of an acid and a base or dissolution of a cerium compound, such as cerium hydroxide, with an acid. They are composed of cerium cations and anions so that the product is electrically neutral.

It is advantageous to use a salt of cerium with a purity of at least 99.5%, more particularly of at least 99.9%. The cerium salt solution may be an aqueous ceric nitrate solution. This solution is obtained by reaction of nitric acid with an hydrated cerix oxide prepared conventionally by reaction of a solution of a cerous salt and of an aqueous ammonia solution in the presence of aqueous hydrogen peroxide to convert $Ce^{III}$ cations into $Ce^{IV}$ cations. It is also particularly advantageous to use a ceric nitrate solution obtained according to the method of electrolytic oxidation of a cerous nitrate solution as disclosed in FR 2570087. A solution of ceric nitrate obtained according to the teaching of FR 2570087 may exhibit an acidity of around 0.6 N.

The cerium salt solution of the present invention may have a cerium cation concentration comprised between 5 and 150 g/L expressed in terms of cerium oxide. For instance, a concentration of 225 g/L of cerium nitrate corresponds to 100 g/L of $CeO_2$; a concentration of 318 g/L of cerium ammonium nitrate corresponds to 100 g/L of $CeO_2$; a concentration of 193 g/L of cerium sulfate corresponds to 100 g/L of $CeO_2$; a concentration of 270 g/L of cerium ammonium sulfate corresponds to 100 g/L of $CeO_2$. The cerium salt concentration of the cerium solution may be adjusted between 10 and 120 g/L, more preferably between 15 and 100 g/L, in terms of cerium oxide, usually with water, preferably with deionized water.

The cerium salt solution may be acidic. The acidity can be developed by dissolving the salt in water or an acid, such as $HNO_3$ and $H_2SO_4$ can be added. The amount of $H^+$ can be from 0.01 and 1 N.

A typical cerium salt solution contains $Ce^{IV}$, optionally $Ce^{III}$, $H^+$ and $NO_3^-$. It may be obtained by mixing the appropriate quantities of nitrate solutions of $Ce^{IV}$ and $Ce^{III}$ and by optionally adjusting the acidity. An example of an aqueous solution that may be used is disclosed in example 1.

According to the present method, next the cerium salt solution prepared in step (a) is held between 60 and 220° C. under heating to cause reaction of the cerium solution in step (b), in order to obtain a suspension comprising a liquid medium and a precipitate. The precipitate may be in the form of cerium hydroxide. Any reaction vessel may be used in step (b) without critical limitation, and either a sealed vessel or an open vessel may be used. Specifically, an autoclave reactor may preferably be used.

In step (b), the temperature is comprised between 60 and 220° C., preferably between 80 and 180° C., more preferably between 90 and 160° C. Duration of heat treatment is usually between 10 minutes and 48 hours, preferably between 30 minutes and 36 hours, more preferably between 1 hour and 24 hours. As detailed in the examples, the temperature can be between 90° C. and 140° C. The duration can be between 30 min to 1 hour. Without wishing to be bound by any particular theory, the function of this heating step is to improve the crystallinity of the precipitate and result in a better heat resistance of the cerium oxide of the invention.

In the present invention, the steps (a) and (b) may be conducted in one step. In such instance, the combined step comprises heating said cerium salt solution comprising anions and cations, wherein between 90 and 100 mol % of the cerium cations are tetravalent cerium cations at a temperature comprised between 60 and 220° C. in order to obtain a suspension comprising a liquid medium and a precipitate.

In step (c), water is added to decrease the concentration of the anions present in the liquid medium. The concentration of the anions from the cerium salt present in the liquid medium is decreased by between 10 and 90 mol %, preferably between 15 and 85 mol %, in comparison with anions comprised in the liquid medium in step (b). If the same amount of anions is present in step (a) and (b), the decrease of anions in the liquid medium in step (c) may be calculated in comparison with anions comprised in the liquid medium in step (a) or (b). Thus, [anions] in step (c)/[anions] in step (b) is between 10-90%, preferably 15-85%. When the method involves the typical aqueous solution disclosed above, $[NO_3^-]$ in step (c)/$[NO_3^-]$ in step (b) is between 10-90%, preferably 15-85%.

Anions from the cerium salts may be for instance nitrate from cerium nitrate or sulfate from cerium sulfate.

This decrease of anions concentration present in the liquid medium may be obtained by at least one of the following methods:

addition of water, preferably deionized water, to the suspension obtained in step (b); and/or removing at least a part of the liquid medium from the suspension obtained in step (b) and then adding water, preferably deionized water, to the medium. Said medium is defined according to partial removal or complete removal of liquid medium as previously expressed; i.e. medium may be a precipitate in case of complete removal of liquid medium in step or rather a mixture of precipitate and liquid medium in case of partial removal of liquid medium.

Separation of the liquid medium from the precipitate may be carried out, for example, by Nutsche filter method, centrifuging, filter pressing, or decantation.

According to the invention, partial removal or complete removal of liquid medium is understood to mean that the liquid medium is partially, or completely removed from the precipitate. For example between 10 and 100% by weight, preferably between 10 and 90% by weight, more preferably between 15 and 95% by weight, especially between 20 and 90% by weight, of the liquid medium present in step (b) may be removed in step (c).

The decrease of the concentration can be determined through mass balance and calculations of the amount of anions in the liquid media of step (b) and step (c). In the case of cerium nitrate, decrease of concentration of anions present in the liquid medium in step (c) in comparison with anions comprised in the liquid medium in step (b), may be calculated as follows in case of cerium nitrate:

Materials at the start of step (a) are Ce(IV)(NO$_3$)$_4$ and Ce(III)(NO$_3$)$_3$ and optionally HNO$_3$.

1. Calculation of total number of NO$_3^-$ ions (mol)

$$NO_3^-(mol)=A/172.12\times[B/100\times4+(100-B)/100\times3]+C=D$$

wherein:

A is quantity of cerium cations in terms of CeO$_2$ (gram), in step (a)

B is percentage of tetravalent cerium cations per total cerium cations, at the start of step (b)

C is quantity of HNO$_3$ (mol) if any, in step (a)

2. Calculation of NO$_3^-$ concentration in step (b)

$$[NO_3^-](mol/l)=D/E$$

wherein E is volume (liter) of reaction medium in step (b). B may be measured directory such as using measuring cylinder, or gauge.

3. Calculation of NO$_3^-$ concentration in step (c)

$$[NO_3^-](mol/l)=F/G$$

F is quantity of NO$_3^-$ ions (mol). F=D if the liquid medium is not removed.

$F=D\times$removal ratio of liquid medium if the liquid medium is removed.

G is volume (liter) after adding of water.

4. Decrease ratio of NO$_3^-$ concentration decrease ratio of [NO$_3^-$](%)=[NO$_3^-$] in step (c)/[NO$_3^-$] in step (b)$\times100$=(F/G)/(D/E)$\times100$.

Control of the anion concentration may be conducted by a direct measurement of the anion concentration of step (b) and (c). NO$_3^-$ concentration can be analyzed by ion chromatography or adsorptiometer, both apparatus being commonly used to analyze NO$_3^-$ concentration in the liquid medium. A part of the liquid medium is put in the analyzer to automatically measure the NO$_3^-$ concentration. It is then possible to compare the both concentrations to calculate the decrease ratio of NO$_3^-$ concentration.

In step (d), the suspension is heated at a temperature comprised between 100 and 300° C., preferably comprised between 110 and 150° C. Any reaction vessel may be used without critical limitation, and either a sealed vessel or an open vessel may be used. Specifically, an autoclave reactor may preferably be used. The duration of heat treatment is usually between 10 minutes and 48 hours, preferably between 30 minutes and 36 hours.

Following step (d), the heated suspension may be cooled in an optional step (e). The suspension may usually be cooled under stirring. Means for cooling are not critical, and it may be cooling in an atmosphere or forced cooling with cooling tube. The temperature of the suspension after cooling may be comprised between 20 and 90° C.

According to step (f), a basic compound is then added to the suspension, or the suspension having been cooled. This basic compound may be for example sodium hydroxide, potassium hydroxide, an aqueous ammonia solution, ammonia gas, or mixtures thereof, with an aqueous ammonia solution being preferred. The basic compound may be added by first preparing an aqueous solution of the basic compound at a suitable concentration and adding the solution to the cooled suspension prepared in step (e) under stirring, or when ammonia gas is used, by blowing the ammonia gas into the reaction vessel under stirring. The amount of the basic compound may easily be decided by tracing the pH change of the solution. Usually, a sufficient amount is such that the pH of the solution is not lower than 7, and a preferred amount is such that the pH is between 7 and 9. Basic compounds are especially useful to precipitate Ce$^{3+}$ ions which are dispersed in the suspension at the end of step (d) or (e) to form then Ce(OH)$_3$ precipitates.

In the method according to the present invention, the suspension prepared in accordance with the step (f) is held between 60 and 300° C. in step (g). Without wishing to be bound by particular theory, this step is believed to modify crystallinity of cerium oxide precursors present in the solution obtained by step (f) so to increase the crystal size thereof.

Any reaction vessel may be used in step (b) without critical limitation, and either a sealed vessel or an open vessel may be used. Specifically, an autoclave reactor may preferably be used.

In step (g), the temperature is comprised between 60 and 220° C., preferably between 90 and 200° C., more preferably between 90 and 160° C. Duration of heat treatment is usually between 10 minutes and 48 hours, preferably between 30 minutes and 36 hours, more preferably between 1 hour and 24 hours. In the present invention, the temperature in the step (g) may be between 90 and 120° C. In the present invention, the duration of heat treatment in the step (g) may be from 1 hour to 2 hours.

In step (h), separation of the liquid medium from the precipitate, may be carried out, for example, by Nutsche filter method, centrifuging, filter pressing, or decantation. The precipitate may optionally be washed with water, preferably with water at basic pH, for example aqueous ammonia solution. Further, the precipitate may optionally be dried.

It is also possible to add at any point between after step (c) and before step (i) of the process a metal compound other than cerium compound, for example a metal element (except for cerium) in the form of nitrate, chloride, oxide, hydroxide, carbonate, halide, oxyhalide, oxynitrate, and/or sulfate. Examples of the metal element (except for cerium) include (1) metallic elements in Group 4A in the periodic table, such as silicon (Si) and tin (Sn), (2) metal elements in Group 4B in the periodic table, such as titanium and zirconium, (3) metal elements in Group 3A in the periodic table, such as aluminum, (4) alkali metal elements, such as barium and strontium, and (5) rare earth element (REE) or rare earth metal being one of a set of seventeen chemical elements in the periodic table, meaning the fifteen lanthanides plus scandium and yttrium. Preferably, the rare earth element oxides are chosen in the group consisting of: lanthanium oxide ($La_2O_3$), praseodymium oxide ($Pr_6O_{11}$), neodymium oxide ($Nd_2O_3$) and yttrium oxide ($Y_2O_3$).

Cerium oxide particles obtained by the process of the invention may then comprise at least one metal oxide, other than cerium oxide, for instance in a proportion comprised between 1 and 40% by weight of oxide, preferably in a proportion comprised between 1 and 20% by weight of oxide. Oxide refers there to final mixed oxide defined as integration of cerium oxide and the other metal oxide.

In step (i), an organic texturing agent is added to the suspension obtained in the preceding step (g) or the precipitate obtained in step (h) once separated from the liquid medium. According to one embodiment of the present invention, the method of the present invention is conducted without the step (i). According to another embodiment of the present invention, the method of the present invention is conducted including the step (i).

An organic texturing agent usually refers to an organic compound, such as a surfactant, able to control or modify the mesoporous structure of the cerium oxide. "Mesoporous structure" basically describes a structure which specifically comprises pores with an average diameter comprised between 2 and 50 nm, described by the term "mesopores". Typically, these structures are amorphous or crystalline compounds in which the pores are generally distributed in random fashion, with a very wide pore-size distribution.

The organic texturing agent may be added directly or indirectly. It can be added directly to the suspension or precipitate resulting from the preceding step. It can also be first added in a composition, for instance comprising a solvent of the organic texturing agent, and said composition being then added to the suspension or precipitate as previously obtained.

The amount of organic texturing agent used, expressed as percentage by weight of additive relative to the weight of the cerium in terms of $CeO_2$, is generally between 5 and 100%, more particularly between 15 and 60%, preferably between 20 to 30%.

The organic texturing agent may be adsorbed on the surface of secondary particles and primary particles of the precipitates. For instance, the organic texturing agent adsorbed on the primary particles will lead to increase the size of mesopores and pore volume of the precipitate.

Organic texturing agents are preferably chosen in the group consisting of: anionic surfactants, nonionic surfactants, polyethylene glycols, carboxylic acids and their salts, and surfactants of the carboxymethylated fatty alcohol ethoxylate type. With regard to this additive, reference may be made to the teaching of application WO-98/45212 and the surfactants described in this document may be used.

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfosuccinates, and alkylbenzene or alkylnapthalene sulfonates.

As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammonium.

By way of example, mention may be made more particularly of lauric acid and ammonium laurate.

Finally, it is possible to use a surfactant which is selected from those of the carboxymethylated fatty alcohol ethoxylate type.

The expression "product of the carboxymethylated fatty alcohol ethoxylate type" is intended to mean products consisting of ethoxylated or propoxylated fatty alcohols comprising a —$CH_2$—COOH group at the end of the chain.

These products may correspond to the formula:

$$R_1-O-(CR_2R_3-CR_4R_5-O)_n-CH_2-COOH$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$—$CH_2$—O— groups.

Optionally in step (j) the precipitate is separated off from the liquid medium, for example, by Nutsche filter method, centrifuging, or filter pressing. The precipitate may optionally be washed with an aqueous solution, preferably with water at basic pH, for example aqueous ammonia solution. Further, the precipitate may optionally be dried to a suitable extent for improving the efficiency in the following step.

In step (k), the precipitate obtained in the preceding step is calcined to obtain the cerium oxide particles which are the object of the invention. Calcination is preferably conducted in air.

Process of the invention then comprises either a step (h) of separation of the liquid medium from the precipitate, either a step (j) separating off the precipitate from the liquid medium, or both step (h) and step (j); in order to proceed with calcination of the precipitate obtained at the end of step (g) or obtained at step (h), (i) or (j) to obtain cerium oxide particles.

In step (k), the calcination temperature may suitably be selected from the range of usually between 250 and 900° C.

The selection of the temperature may be made as desired, depending on the required values of the specific surface area and bulk density. From a practical point of view to prepare a catalyst or a co-catalyst material wherein the specific surface area is important, the calcination temperature in step (k) may preferably be between 250 and 800° C., more preferably between 250 and 700° C., most preferably between 280 and 450° C. The duration of calcination may suitably be determined depending on the temperature, and may preferably be between 1 and 20 hours.

After step (k), the cerium oxide particles obtained may usually be pulverized. The pulverization may sufficiently be performed in an ordinary pulverizer, such as a hammer mill, to obtain a powder of a desired particle size. The cerium oxide obtained by the present method may be given a desired particle size through the above mentioned pulverization. For use as a co-catalyst in a catalyst for purifying exhaust gas, for example, a preferred average particle size D50 of the cerium oxide is between 0.05 and 50 µm, D50 being measured by laser diffraction with a distribution in volume. The measurement can be performed on a suspension of the cerium oxide particles in water. The distribution may be obtained for instance with a LA-920 particle size analyzer commercialized by Horiba, Ltd.

In the method according to the present invention, trivalent $Ce^{III}$ cations must be present in one of the steps before the precipitation step (f). $Ce^{III}$ cations may for instance be present in the cerium salt solution of step (a). According to a preferred embodiment, $Ce^{III}$ cations are present after step (c). The presence of $Ce^{III}$ cations may be obtained by addition of a $Ce^{III}$ salt, such as nitrate, chloride, hydroxide, carbonate, and sulfate of $Ce^{III}$. It may also be obtained by the addition of a reducing agent to reduce a part of $Ce^{IV}$ cations already present, for instance by adding hydrogen peroxide or oxalic acid or both. The molar ratio of $Ce^{III}$ cations relative to the amount of cerium (III) cations and cerium (IV) cations in or after the step (c) and before the step (f) may be from 5 to 30. The molar ratio of $Ce^{III}$ cations is preferably at least 7. The molar ratio of $Ce^{III}$ cations is preferably controlled to no more than 20, more preferably no more than 15.

The conditions of examples 1-3 may be used to prepare the cerium oxide particles of the invention. The cerium oxide particles of the present invention may preferably be prepared by the method according to the present invention.

About the Cerium Oxide Particles

Cerium oxide particles having surprisingly excellent heat resistance, especially having high heat resistance under "humid" conditions (700° C.; gaseous atmosphere containing 10% by volume of $O_2$, 10% by volume of $H_2O$ and the balance of $N_2$), can be obtained via the method of the present invention. Thus, the invention relates to cerium oxide particles as defined in claim 1.

The cerium oxide particles preferably have a specific surface area (SBET) comprised between 75 and 90 $m^2/g$, more particularly between 78 and 90 $m^2/g$ after calcination at 700° C. for 4 hours, under a gaseous atmosphere containing 10% of $O_2$, 10% of $H_2O$ and the balance of $N_2$. The specific conditions of the "humid" conditions may also be found in the examples.

The cerium oxide particles preferably have a specific surface area (SBET) comprised between 60 and 80 $m^2/g$ after calcination at 900° C. for 5 hours, under air.

The cerium oxide particles may be further characterized by a total pore volume comprised between 0.8 and 4.0 ml/g, more particularly between 0.8 and 2.5 ml/g, even more particularly between 0.8 and 2.0 ml/g after calcination at 400° C. for 10 hours, under air.

The cerium oxide particles may be further characterized by a total pore volume comprised between 0.70 and 1.9 ml/g after calcination at 900° C. for 24 hours, under air.

The cerium oxide particles may be further characterized by a pore volume of the pores having a pore size in the range of no more than 200 nm comprised between 0.27 and 0.9 ml/g, more particularly between 0.27 and 0.7 ml/g after calcination at 400° C. for 10 hours, under air.

The cerium oxide particles may be further characterized by a pore volume of the pores having a pore size in the range of no more than 200 nm comprised between 0.23 and 0.65 ml/g after calcination at 900° C. for 24 hours, under air.

The cerium oxide particles may be obtained from the method of the present invention, in particular the method in which the addition of an organic texting agent in step (i) is not conducted, yet the present invention is not limited thereto.

The total pore volume or pore volume of the pores having a pore size in the range of no more than 200 nm may be measured by ordinary mercury porosimeter, which is further detailed in the following examples.

Further, the inventors of the present invention have surprisingly found cerium oxide particles having a certain porosity, an outstanding pore volume and heat stability associated therewith. Thus, according to an embodiment, the present invention as to product also relates to cerium oxide particles having a specific surface area (SBET) comprised between 37 and 60 $m^2/g$, more particularly between 40 and 60 $m^2/g$, even more particularly between 45 and 60 $m^2/g$ after calcination at 900° C. for 24 hours, under air.

The cerium oxide particles according to the embodiment may have a specific surface area (SBET) comprised between 26 and 40 $m^2/g$ after calcination at 1000° C. for 5 hours, under air.

The cerium oxide particles according to the embodiment may have a total pore volume comprised between 1.5 and 4.0 ml/g, more particularly between 1.7 and 4.0 ml/g, after calcination at 400° C. for 10 hours, under air.

The cerium oxide particles according to the embodiment may have a total pore volume comprised between 1.5 and 3.8 ml/g, more particularly between 1.7 and 3.8 ml/g after calcination at 900° C. for 24 hours, under air.

The cerium oxide particles according to the embodiment may have a pore volume of the pores having a pore size in the range of no more than 200 nm comprised between 0.3 and 1.5 ml/g, more particularly between 0.4 and 1.5 ml/g, after calcination at 400° C. for 10 hours, under air.

The cerium oxide particles according to the embodiment may have a pore volume of the pores having a pore size in the range of no more than 200 nm comprised between 0.25 and 1.0 ml/g, more particularly between 0.4 and 1.0 ml/g, after calcination at 900° C. for 24 hours, under air.

The cerium oxide particles according to the embodiment preferably have a specific surface area (SBET) of at least 40 $m^2/g$, more preferably at least 43 $m^2/g$, still more preferably 45 $m^2/g$, after calcination at 900° C. for 24 hours, under air.

The cerium oxide particles according to the embodiment have a specific surface area (SBET) of at least 25 $m^2/g$, more particularly of at least 28 $m^2/g$, more preferably at least 30 $m^2/g$, still more preferably 32 $m^2/g$, after calcination at 1000° C. for 5 hours, under air.

The cerium oxide particles according to the embodiment preferably have a total pore volume of at least 1.6, more preferably at least 1.7, still more preferably at least 1.8, yet more preferably at least 1.9, further more preferably at least 2.0, far more preferably at least 2.1, still far more preferably at least 2.2, yet far more preferably at least 2.3, especially preferably at least 2.4, particularly preferably at least 2.5, most preferably at least 2.6 ml/g, after calcination at 400° C. for 10 hours under air.

The cerium oxide particles according to the embodiment preferably have a total pore volume of at least 1.6, more preferably at least 1.7, still more preferably at least 1.8, yet more preferably at least 1.9, further more preferably at least 2.0, far more preferably at least 2.1, still far more preferably at least 2.2, yet far more preferably at least 2.3, especially preferably at least 2.4, particularly preferably at least 2.5 ml/g, after calcination at 900° C. for 24 hours under air.

The cerium oxide particles according to the embodiment preferably have a pore volume of the pores having a pore size in the range of no more than 200 nm, of at least 0.35, more preferably at least 0.40, still more preferably at least 0.45, yet more preferably at least 0.50, further more preferably at least 0.55, far more preferably at least 0.60, still far more preferably at least 0.65, yet far more preferably at least 0.70 ml/g, after calcination at 400° C. for 10 hours under air.

The cerium oxide particles according to the embodiment preferably have a pore volume of the pores having a pore size in the range of no more than 200 nm of at least 0.30, more preferably at least 0.35, still more preferably at least 0.40, yet more preferably at least 0.45 ml/g, after calcination at 900° C. for 24 hours under air.

The cerium oxide particles according to the embodiment may be obtained from the method of the present invention, in particular the method in which the addition of an organic texturing agent in step (i) is included in the method, yet the present invention is not limited thereto.

The cerium oxide particles of the present invention may also comprise at least one metal oxide, other than cerium oxide, for instance in a proportion comprised between 1 and 40% by weight of oxide, preferably in a proportion comprised between 1 and 20% by weight of oxide. Oxide refers there to final mixed oxide defined as integration of cerium oxide and metal oxide.

Cerium oxide particles as described above or as obtained by means of the method of preparation previously described may be in the form of powders, but they can optionally be formed so as to be in the form of granules, pellets, foams, beads, cylinders or honeycombs of variable dimensions.

The present invention also concerns a catalyst comprising at least cerium oxide particles as previously defined, such as a catalyst for purifying exhaust gas. The cerium oxide particles of the invention may be applied as such or within a composition to any support commonly used in the field of catalysis, that is to say in particular thermally inert supports. This support can be chosen from alumina, titanium oxide, cerium oxide, zirconium oxide, silica, spinels, zeolites, silicates, crystalline silicoaluminum phosphates or crystalline aluminum phosphates.

The catalyst for purifying exhaust gas according to the present invention may be of any type, as long as it has a co-catalyst containing the cerium oxide of the present invention. The catalyst may be produced, for example, by a commonly known method and with commonly known other materials.

The invention also concerns a composition, preferably a liquid composition, comprising at least cerium oxide particles as previously obtained and defined. More preferably said composition is a suspension comprising at least a liquid medium and cerium oxide particles as previously obtained and defined.

According to an embodiment of the invention, the invention also relates to the use of cerium oxide particles as defined and/or as obtained in the above identified process for the polishing application. For instance, a composition, such as a suspension, for polishing comprising at least the cerium oxide particles of the invention may be obtained. This composition can be used for polishing glass, for example in the crystal-making or mirror industry, flat glass, television screens or spectacles, or else for polishing ceramics or other materials of vitreous type. This composition can also be used most particularly for CMP-type polishing in the electronics industry and therefore for polishing metal substrates which go to make up microprocessors, but also for polishing insulating layers or Interlayer Dielectric (ILD) layers of these same microprocessors, the suspension of the invention being particularly suitable for the polishing of said layers. Chemical mechanical planarization (CMP) is a key process enabling Shallow Trench Isolation (STI), which is used in current integrated circuit manufacturing processes to achieve device isolation. These layers are generally made of silica, such as doped silica or porous silica. This suspension may also be used for metal CMP for wiring and barrier in integrated circuit, polishing a photomask substrate, especially made of a synthetic quartz glass. In the present invention, the term "polishing" is understood to include the meaning of both conventional polishing, such as glass polishing, and polishing of surface of semiconductive materials, such as silicon wafer in semiconductor application, often called as "planarization."

In general, such compositions comprise, in addition to the compound with abrasive property, such as the oxide particles, additives such as a dispersing agent and/or an oxidant.

The present invention also concerns a method of removing a portion of a substrate, for instance in a CMP operation, comprising:

providing at least a composition, for instance a suspension, comprising cerium oxide particles of the invention, contacting at least the composition and the substrate to be polished, and performing the polishing on the substrate.

The following examples are included to illustrate embodiments of the invention. Needless to say, the invention is not limited to described examples.

Experimental Part

Specific Surface Areas

The specific surface areas (BET) by adsorption of $N_2$ were determined automatically on a Flowsorb II 2300 or a Macsorb analyzer model 1-1220 (Mountech Co., LTD.). Prior to any measurement, the samples are carefully degassed to desorb any adsorbed species. To do so, the samples may be heated at 200° C. for 2 hours in a stove, then at 300° C. for 15 min in the cell.

Hg Porosity

The porosity measurements were conducted on a Micromeritics Autopore IV 9500 equipped with penetrometer adapted for powders following the guidelines of Micromeritics. Similarly, prior to any measurement, the samples are carefully degassed to desorb any adsorbed species. The following parameters may be used: penetrometer 3.2 ml; capillary volume: 0.412 ml; head pressure: 4.68 psi; contact angle: 130°; mercury superficial tension: 485 dynes/cm; mercury density: 13.5335 g/ml. A vacuum is first applied on the sample (50 mm Hg; 5 min). The duration of the equilibrium is: low pressures (1.3-30 psi): 20 s; (30-60 000 psi): 30 s. Before the measurement, the samples are heated at 400° C. for 10 hours. Total pore volume is determined directly on the porosity curves.

"Humid" Conditions

The cerium oxide particles are evaluated under "humid" conditions (700° C.; gaseous atmosphere containing 10% by volume of $O_2$, 10% by volume of $H_2O$ and the balance of $N_2$). The samples are prepared in the following way.
- the solid is compacted in the form of a cylindrical pellet of 32 mm diameter by applying the powder to a pressure of 30 tons for 2 min;
- the pellet so obtained is then deagglomerated in a mortar to give a powder which was sieved so as to retain only the fraction of the powder which passed through a sieve of 250 μm and retained by a sieve of 125 μm;
- the powder (2.2 g) thus obtained is hydrothermally aged at 700° C. for 4 h under a synthetic gas containing 10% by volume $O_2$, 10% by volume $H_2O$ and balance $N_2$ (24 L/h flow rate (20° C.; 1 atm) over the powder);
- the SBET is then measured in accordance with the BET measurement method explained in the above.

The same conditions could be applied on the cerium oxide particles with platinum which can be prepared as follows:
- 9.9 grams of the cerium oxide in the form of a powder is impregnated with amine solution of platinum hydroxide (containing 0.1 gram of Pt). The product is dried at around 120° C. and further calcined under air at 500° C. for 4 h;
- the whole solid is then compacted in the form of a cylindrical pellet of 32 mm diameter by applying the powder to a pressure of 30 tons for 2 min;
- the pellet is then deagglomerated in a mortar to give a powder which was sieved so as to retain only the fraction of the powder which passed through a sieve of 250 μm and retained by a sieve of 125 μm;
- the cerium oxide with Pt (2.2 g) thus obtained is hydrothermally aged at 700° C. for 4 h under a synthetic gas containing 10% by volume $O_2$, 10% by volume $H_2O$ and balance $N_2$ (24 L/h flow rate (20° C.; 1 atm) over the powder);
- the SBET is then measured in accordance with the BET measurement method explained in the above.

Example 1

50 g of a ceric nitrate solution in terms of $CeO_2$ containing not less than 90 mol % tetravalent cerium cations was measured out, and adjusted to a total amount of 1 L with deionized water. The obtained solution was heated to 100° C., maintained at this temperature for 30 minutes, and allowed to cool down to 25° C., to thereby obtain a cerium suspension.

After the mother liquor was removed from the cerium suspension thus obtained, the total volume was adjusted to 1 L with deionized water; concentration of anions is hence decreased by 44%, in comparison with anions comprised in the liquid medium after heating. After the removal of the mother liquor, a solution of trivalent $Ce^{III}$ cations in a form of nitrate ($Ce(NO_3)_3$) was added so as to control the amount of $Ce^{III}$ cations based on the total amount of cerium cations to 6 mol %.

Then the cerium suspension was maintained at 120° C. for 2 hours, allowed to cool, and neutralized to pH 8.5 with aqueous ammonia.

The obtained mixture was heated to 120° C., maintained at this temperature for 1 hour, and allowed to cool down to 25° C., thereby obtaining a slurry. The obtained slurry was subjected to solid-liquid separation through a Nutsche filter to obtain a filter cake. The cake was calcined in the air at 400° C. for 10 hours to obtain cerium oxide powder.

The obtained composite oxide powder was measured of the specific surface area by the BET method after calcination at 900° C. for 5 hours under air, 700° C. for 4 hours under the humid conditions as already described above, total pore volume (before and after the calcination at 900° C. for 24 hours under air), and pore volume of pores having no more than 200 nm size (before and after the calcination at 900° C. for 24 hours under air).

Example 2

A cerium oxide powder was prepared in the same way as in Example 1 except that after the thermal aging at the temperature of 120° C. for 1 hour, the obtained slurry was allowed to cool down to 40° C., and then, 12.5 g of lauric acid was added to the slurry.

The obtained composite oxide powder was measured of the specific surface area by the BET method after calcination at 900° C. for 5 hours under air, 900° C. for 24 hours under air, 1000° C. for 5 hours under air, total pore volume (before and after the calcination at 900° C. for 24 hours under air), and pore volume of pores having no more than 200 nm size (before and after the calcination at 900° C. for 24 hours under air).

Example 3

A cerium oxide powder was prepared in the same way as in Example 2 except that the amount of $Ce^{III}$ cations based on the total amount of cerium cations was controlled to 8 mol %, instead of 6 mol %.

The properties of the oxide powder thus obtained were evaluated in the same way as in Example 2, except for SBET 1000° C./5 h under air.

Comparative Example 1

A cerium oxide powder was prepared in accordance with the method disclosed in Patent Publication U.S. Pat. No. 7,361,322 B2. Thus, 20 g of a ceric nitrate solution in terms of $CeO_2$ containing not less than 90 mol % tetravalent cerium cations was measured out, and adjusted to a total amount of 1 L with deionized water. The obtained solution was heated to 100° C., maintained at this temperature for 24 hours, and allowed to cool down to the room temperature. Then aqueous ammonia was added to neutralize to pH 8 to obtain cerium oxide hydrate in the form of the slurry.

The slurry was then subjected to solid-liquid separation with a Nutsche filter to obtain a filter cake. The cake was calcined in the air at 300° C. for 10 hours to obtain cerium oxide powder.

Those properties measured in Examples 1 and 2 of the oxide powder thus obtained were evaluated in the same way. Properties of the cerium oxides prepared in the above defined examples are mentioned in Table 1.

TABLE 1

|  | Examples | | | |
| --- | --- | --- | --- | --- |
|  | Ex. 1 | Ex. 2 | Ex. 3 | Comp. 1 |
| SBET 900° C./5 h | 56 | 63 | 61 | 46 |
| SBET 900° C./24 h | — | 49 | 48 | 34 |

TABLE 1-continued

| | Examples | | | |
|---|---|---|---|---|
| | Ex. 1 | Ex. 2 | Ex. 3 | Comp. 1 |
| SBET 1000° C./5 h | — | 32 | — | 25 |
| SBET 700° C./4 h under "humid" conditions (700° C.; gaseous atmosphere containing 10% by volume of $O_2$, 10% by volume of $H_2O$ and the balance of $N_2$) | 80 | — | — | 75 |
| total pore volume 400° C./10 h | 0.83 | 1.79 | 2.07 | 0.75 |
| total pore volume 900° C./24 h | 0.79 | 1.72 | 1.71 | 0.65 |
| pore volume <200 nm 400° C./10 h | 0.31 | 0.45 | 0.75 | 0.25 |
| pore volume <200 nm 900° C./24 h | 0.25 | 0.44 | 0.45 | 0.20 |

SBET in m2/g; pore volume in ml/g

Example 4: Low Temperature $NO_x$ Storage Capacity Testing

The cerium oxides of Example 1 and Comparative example 1 are calcined under a synthetic gas containing 10% by volume of $O_2$, 10% by volume of $H_2O$ and balance being $N_2$ (24 L/h flow rate over 2.2 g catalyst). The $NO_x$ storage capacity is then measured in the following way: a synthetic gas mixture (30 L/h), representative of the catalytic process with the composition A given below is flushed during 90 min at 120° C. through 150 mg of cerium oxide placed in a fixed bed reactor. The amount of $NO_x$ stored is monitored on line in function of the time, owing to an Antaris IGS FTIR Spectrometer.

| Composition A | |
|---|---|
| | (vol %) |
| NO | 0.014 |
| $NO_2$ | 0.018 |
| $H_2O$ | 5 |
| $CO_2$ | 5 |
| $O_2$ | 10 |
| $N_2$ | balance |

$NO_x$ adsorption of both cerium oxides of Example 1 and Comparative example 1 at 90 mins is shown in Table 2:

TABLE 2

| | $NO_x$ adsorbed (µg NOx/g Ce oxide) |
|---|---|
| Ex. 1 | 22.6 |
| Comp. 1 | 19.2 |

It appears then that the cerium oxide of the present invention has a higher $NO_x$ capture performance than conventional cerium oxide after hydro-thermal aging. NSC ($NO_x$ storage capacity) is an indicator to evaluate the $NO_x$ emission performance.

The invention claimed is:

1. Cerium oxide particles having the following properties:
   a specific surface area (SBET) ranging between 55 and 80 m²/g after calcination at 900° C. for 5 hours, under air; and
   a specific surface area (SBET) ranging between 75 and 90 m²/g after calcination at 700° C. for 4 hours, under a gaseous atmosphere containing 10% by volume of $O_2$, 10% by volume of $H_2O$ and the balance of $N_2$.

2. Cerium oxide particles according to claim 1 exhibiting a specific surface area (SBET) ranging between 30 and 60 m²/g after calcination at 900° C. for 24 hours, under air.

3. Cerium oxide particles according to claim 1 exhibiting a specific surface area (SBET) ranging between 22 and 40 m²/g after calcination at 1000° C. for 5 hours, under air.

4. Cerium oxide particles according to claim 1 exhibiting a total pore volume ranging between 0.8 and 4.0 ml/g after calcination at 400° C. for 10 hours, under air.

5. Cerium oxide particles according to claim 1 exhibiting a total pore volume ranging between 0.70 and 1.9 ml/g after calcination at 900° C. for 24 hours, under air.

6. Cerium oxide particles according to claim 1 exhibiting a pore volume of the pores having a pore size in the range of no more than 200 nm ranging between 0.27 and 0.9 ml/g after calcination at 400° C. for 10 hours, under air.

7. Cerium oxide particles according to claim 1 exhibiting a pore volume of the pores having a pore size in the range of no more than 200 nm ranging between 0.23 and 0.65 ml/g after calcination at 900° C. for 24 hours, under air.

8. Cerium oxide particles according to claim 1 exhibiting a total pore volume ranging between 1.5 and 4.0 ml/g after calcination at 400° C. for 10 hours, under air.

9. Cerium oxide particles according to claim 8 exhibiting a total pore volume ranging between 1.5 and 3.8 ml/g after calcination at 900° C. for 24 hours, under air.

10. Cerium oxide particles according to claim 8 exhibiting a pore volume of the pores having a pore size in the range of no more than 200 nm ranging between 0.3 and 1.5 ml/g after calcination at 400° C. for 10 hours, under air.

11. The cerium oxide particles according to claim 8 exhibiting a pore volume of the pores having a pore size in the range of no more than 200 nm ranging between 0.25 and 1.0 ml/g after calcination at 900° C. for 24 hours, under air.

12. Cerium oxide particles according to claim 8 exhibiting a specific surface area (SBET) of at least 40 m²/g after calcination at 900° C. for 24 hours, under air.

13. Cerium oxide particles according to claim 8 exhibiting a specific surface area (SBET) of at least 25 m²/g after calcination at 1000° C. for 5 hours, under air.

14. Cerium oxide particles according to claim 1, exhibiting an amount of $NO_x$ adsorbed higher than or equal to 22 µg $NO_x$ g $CeO_2$ after calcination at 700° C. for 4 hours, under a gaseous atmosphere containing 10% by volume of $O_2$, 10% by volume of $H_2O$ and the balance of $N_2$.

15. A catalyst comprising cerium oxide particles as defined by claim 1.

16. The catalyst according to claim 15, wherein said catalyst is a co-catalyst comprising the cerium oxide particles, for purifying exhaust gas.

17. A composition comprising cerium oxide particles as defined by any one of claims 1 and 2-14.

18. A composition according to claim 17, wherein said composition includes at least one metal oxide other than cerium oxide.

19. A composition according to claim 18, wherein the metal of the at least one other metal oxide is an element selected from the group consisting of: (1) metal elements in Group 4A in the periodic table; (2) metal elements in Group 4B in the periodic table; (3) metal elements in Group 3A in the periodic table; (4) alkali metal elements; and (5) rare earth elements (REEs).

20. A composition according to claim 19, wherein (1) the metal elements in Group 4A of the periodic table are chosen from silicon and/or tin; (2) the metal elements in Group 4B of the periodic table are chosen from titanium and/or zirconium; (3) the metal element in Group 3A of the periodic table is chosen from aluminum; (4) the alkali metal elements are chosen from barium and/or strontium; and (5) the REEs are chosen from any of fifteen lanthanides, scandium, or yttrium.

21. A composition according to claim 18, wherein said at least one other metal oxide is a rare earth element oxide selected from the group consisting of: lanthanum oxide ($La_2O_3$), praseodymium oxide ($Pr_6O_{11}$), neodymium oxide ($Nd_2O_3$) and yttrium oxide ($Y_2O_3$).

\* \* \* \* \*